United States Patent [19]
Fournier

[11] 3,826,375
[45] July 30, 1974

[54] LIQUID-SOLIDS CONTACTING CHAMBER WITH SPHERICAL STRAINER MEANS

[75] Inventor: Paul W. Fournier, New Brighton, Minn.

[73] Assignee: Universal Oil Products Company, Des Plaines, Ill.

[22] Filed: July 20, 1973

[21] Appl. No.: 381,294

Related U.S. Application Data

[63] Continuation-in-part of Ser. No. 163,847, July 19, 1971, abandoned.

[52] U.S. Cl.................. 210/291, 210/292, 210/289
[51] Int. Cl............................................. B01d 35/28
[58] Field of Search........... 210/291, 292, 289, 293, 210/279

[56] References Cited
UNITED STATES PATENTS

| 684,412 | 10/1901 | Davidson | 210/291 |
|---|---|---|---|
| 765,334 | 7/1904 | Davidson | 210/291 |
| 1,569,896 | 1/1926 | Tanner | 210/292 |
| 2,572,097 | 10/1951 | Bakker | 210/292 |
| 3,625,365 | 12/1971 | Armstrong et al. | 210/279 |

Primary Examiner—Charles N. Hart
Assistant Examiner—Benoit Castel
Attorney, Agent, or Firm—James R. Hoatson, Jr.; William H. Page, III; Philip T. Liggett

[57] ABSTRACT

A liquid-solids contacting chamber using a plurality of slotted ball-form strainer-nozzle members to effect the withdrawal and/or distribution of liquid from, or into, the contacting chamber. The plurality of members are utilized as part of the liquid manifold or pipe header system and are of particular advantage over present types of cylindrical form members in that they can provide greater resistance to external crushing pressures, as well as provide more optimum backwash flow patterns in the chamber.

4 Claims, 5 Drawing Figures

LIQUID-SOLIDS CONTACTING CHAMBER WITH SPHERICAL STRAINER MEANS

This application is a continuation-in-part of my earlier co-pending application Ser. No. 163,847, filed July 19, 1971, and now abandoned.

This invention relates to an improved ball-form of strainer-nozzle element useful for mounting in the lower portion of a liquid-solids contacting chamber. More specifically, there is provided a chamber using liquid header means with a plurality of spaced ball or spherical-form, slotted members that are structurally resistant to surrounding crushing pressures and, at the same time, will have vertical slots arranged to provide an optimum liquid distribution pattern which is of advantage over known forms of elements in the same type of service.

Within sand filters, water softeners or ion-exchange chambers, and the like, it is quite customary to have "underdrain" piping with slotted pipe sections or elements which are suitable for withdrawing the water, or other liquid, which is passed through the contact bed of particulates. For example, there are presently in use small slotted cylinder-form elements which are connected to tube sheets or header piping to serve as drain or intake members, as well as backwash nozzles, in the operation of filters and water treating chambers. These cylindrical elements have horizontally oriented slots cut or molded into their wall portions or they may have slots resulting from the stacking of spaced washer-like elements. In any event, these cylindrical members do not have the same strength, for a given wall thickness, as is provided by the spherical-type member. Also, the backwash flow patterns from the horizontal slots results in poor contacting and scrubbing of particulates in areas that are directly above or are slightly below the positionings of the cylinder members.

Conversely, the spherical-form strainer-nozzle with vertically oriented slotting can provide a more uniform backwash or regeneration stream flow within a particle containing chamber in that there is less "dead" area around each of the individual members and better downward flow and scrubbing action on particulates below the level of the plurality of elements. Actually, with spherical-form elements having vertical slots in accordance with the present invention, there can easily be the provision for having a major portion of discharge in that hemispherical portion of the sphere or ball into which the inlet stream is introduced. Such distribution is obtained as long as there is a suitable non-perforate area directly opposite the inlet to the interior of the spherical element, except where there might be excessive slot area provided in the downstream half of the sphere, i.e. where there is a larger open area for the downstream slotting than is provided for the fluid inlet area into the member.

From the aspect of ease of manufacture, as well as from economic considerations, it may be considered a principal object of the present invention to provide spherical-form strainer members that can be made from "plastics" rather than from metals. Thus, again there is the consideration of the inherently greater strength for the sphere, as compared to other shapes, and it is possible to use a less strong material than stainless steel or other metals or alloys, such as one of the various types of polymeric materials which can be readily and inexpensively molded. Special forms of slots can also readily be provided during the mold operation.

Also, it is a further object of the present invention to provide spherical-form strainer elements which have wedge-form vertical slotting spaced over the face portions thereof. More specifically, the slots are tapered so that they enlarge in cross-sectional area from the outer face toward the inside of the member so that particulates will not clog the slots and they will, in effect, be "self-cleaning".

In a broad aspect, the present invention embodies providing in combination with a pressure tight contacting chamber for accommodating the introduction and withdrawal of a liquid stream which can effect contact with a bed of subdivided solid contact material retained therein, and has a liquid distributing-withdrawal manifold section therein which can be subjected to crushing conditions from the superposed material and hydraulic pressure thereon, the improved design and arrangement which comprises a liquid manifold means traversing an interior end portion of said chamber, a fluid port means through said chamber communicating to the interior of said manifold means, and a plurality of hollow spherical-form strainer members spaced along and connective with said manifold means, each strainer member having a generally circumferential row of uniformly spaced vertically oriented slots in an upper hemispherical surface thereof and a second set of vertically oriented slots in a lower hemispherical surface, and such members being spaced to have their discharge and withdrawal zones substantially traverse the cross-sectional area of said chamber and the superposed bed of particulates therein.

This slotting arrangement provides a desired outward and upward flow from the upper row of slots and an outward and downward flow of fluid from the lower row of slots when the members are in operation as flow nozzles.

Also, in a preferred design, each of the strainer members will have each set of the vertical slots that are spaced uniformly around each hemispherical surface of the spherical or ball-form configuration of a wedge-shape increasing in cross-sectionl area from the external surface of the member toward the inside whereby to provide a self-cleaning or non-clogging type of construction. In other words, in the presence of subdivided particulates in the contact chamber, there will be no compacting or clogging of particulates into a particular slot inasmuch as any particles actually entering a slot will pass on through the wall thickness without becoming attached. When the member is acting as a nozzle for a backwash operation, then the wedge-shaped slots will have no effect on the operation of the fluid flow, although in fact, they may enhance the outward stream flow by having a tapering entrance portion to the final slot width at the outer surface of the member.

The manifold arrangement within the contact chamber may comprise a plurality of pipes which laterally or horizontally traverse the cross-sectional area of the chamber so as to accommodate the plurality of ball-form strainer members which, in turn, can be spaced along the top surface of the piping system. In a simplified attachment or mounting of members, there will be the spaced drilling and tapping of the various pipes of the manifold system and external threading provided on a protruding portion of each of the ball-form members such that they may screwed into the pipe members. Other forms of attachment may be provided; however, the threading and tapping system provides for easy assembly and replacement.

In a modified manifold arrangement, there may be a plate or "bulkhead" member which traverses the lower portion of the contact chamber and the plurality of ball-form strainer members are screwed into or otherwise connected to the surface of the bulkhead at spaced points so as to provide uniform fluid withdrawal as well as uniform fluid distribution during a regeneration or backwash operation.

As heretofore set forth, the ball- or spherical-form construction enhances the structural capabilities of the member for inherently resisting crushing pressure that can be exerted from the mass of contact material above the strainer and from hydraulic pressure in turn being exerted upon the solids bed. Actually, at certain times, there may be pulsing flows exerted on the particulate bed which can easily crush or deform strainer members within the treating unit. This spherical-form member also lends itself to being molded from any of the various suitable castable materials which can include all of the various types of "plastics," as well as certain metals. Typically, in a low cost molding operation, the spheres can be manufactured in hemispherical portions and the two half portions in turn bonded together by suitable adhesive agents so as to provide a resulting structurally strong spherical member. Also, it should be noted that the wedge-form slots in the molded spheres or molded half spheres, can be readily provided from the construction of the mold means.

Reference to the accompanying drawing and the following description thereof will serve to illustrate one embodiment of the invention and alternative arrangements for mounting the plurality of ball-form members into a contact chamber.

FIG. 1 of the drawing is a partial sectional elevational view indicating a piping manifold system and a plurality of spaced ball-form strainer elements such as may be utilized in a sand filter or water treating chamber.

FIG. 2 of the drawing is a partial sectional plan view indicating the spaced arrangement of the plurality of ball-form strainer members, such as indicated by line 2—2 in FIG. 1.

FIG. 3 indicates, in a partial sectional elevational view, a modified header system utilizing a partitioning plate with a plurality of spaced spherical-form members, in lieu of a piping header system.

Figure 1:
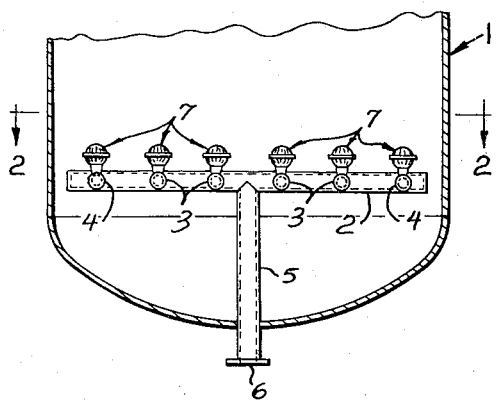
Figure 2:
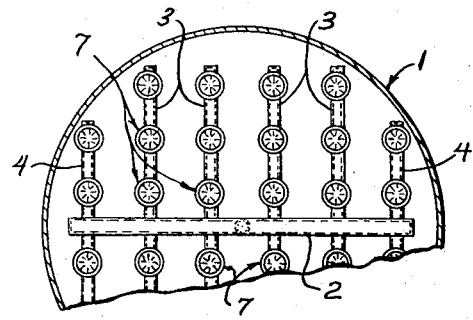

Referring now particularly to FIGS. 1 and 2 of the drawing, there is indicated the lower portion of a chamber 1 which may be utilized for filtering or as an ion-exchange chamber holding resin particles in the softening or treating of water. As an underdrain portion of the treating unit, there is indicated a piping system comprising a central header member 2, a plurality of laterals 3 and 4, as well as a vertical pipe 5 leading to outlet port means 6. Actually, the port means 6, as well as piping means 3, 4 and 5, will periodically be utilized for the introduction of a backwash or regenerating stream, during periods of regenerating the contact material within chamber 1. The lateral pipes 3 and 4, as best shown in FIG. 2, are spaced so as to traverse the cross-sectional area of the interior of chamber 1 and each pipe or tube is adapted to have mounted vertically thereon a plurality of spherical-form strainer-nozzle members 7 which shall have vertical slot means in turn spaced around the wall portions thereof such that water, or other liquid, can be taken interiorly and passed through the piping system to outlet port means 6. Of course, when the unit is having a backwash operation, there will be an outward flow of liquid through the plurality of members 7 into the lower portion of chamber 1 and into contact with the particulates therein.

Figure 3:
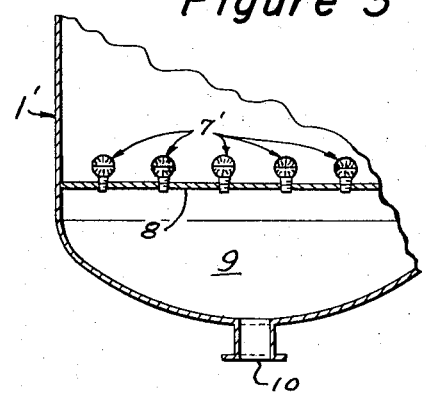

FIG. 3 of the drawing merely indicates diagrammatically that a contact chamber such as 1' may utilize a bulkhead or lateral plate 8 in lieu of a piping system to provide a fluid header zone 9 in the lower portion of the chamber with such header zone being in communication with port means 10. In this instance, plate 8 will have a plurality of attached ball-form strainer-nozzle members 7' which would be the equivalent of those indicated in FIG. 1. Each member 7' will have passageway means to the interior thereof through the attachment means to the header plate 8 such that fluid may be passed from the member into header zone 9 and out from port means 10, or conversely, from header zone 9 into the interior of each member 7' whereby they may serve as nozzle means to distribute the backwash liquid into the resin bed or other contact material of chamber 1'.

Figure 4:
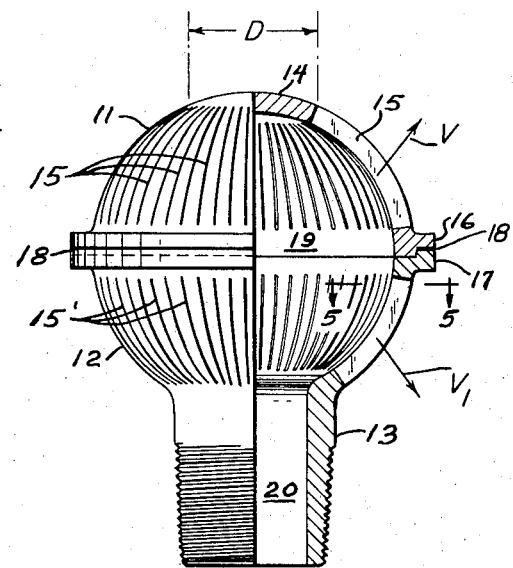
FIG. 4 shows, in an enlarged partial sectional elevational view, the construction of one embodiment of the present invention using slotted and joined hemispherical portions to provide a ball-form strainer member.

Referring now particularly to FIG. 4 of the drawing, there is shown one construction and configuration for a ball-form member such as 7. In this instance, the ball-form member is shown as being constructed of two halves, an upper portion 11 and a lower portion 12 with the latter having a hollow, extended and externally threaded portion 13 whereby the entire unit may be readily mounted into a tapped opening on a pipe or onto a bulkhead plate, such as 8. The upper hemispherical portion 11 is indicated as having a non-perforate portion of diameter "D" at 14 and a plurality of spaced vertical slot openings at 15 as well as a flange 16 adapted to engage flange means 17 on lower portion 12. The latter also has a plurality of spaced vertical slot portions 15' so that the outer wall surface is traversed with fluid openings capable of taking in fluid during that portion of the operations where each member is serving as a part of the underdrain system in a chamber such as 1. The number of slots in the upper and lower hemispheres need not be the same, depending upon flow patterns desired during backwash operations, or upon other design factors.

It will also be noted within FIG. 4 of the drawing that by having a separate row of slots in an upper hemisphere 11 there will be a resulting upward vector V to the outward flow of fluid from slot 15 in this upper portion of the spherical element while, with respect to lower slots 15', there will be a generally downward vector $V_1$ for the resulting outward flow therefrom.

Figure 5:
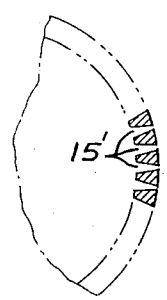
FIG. 5 is a partial sectional view, such as indicated by line 5—5 in FIG. 4, illustrating the wedge-form slots and wedge-form body portions between spaced vertical slots in the surface of the strainer.

The width of each slot 15 or 15' may vary to suit the particular contact material within a given treating chamber but, of course, each will be slightly narrower than the width or diameter of particulates being utilized in the chamber. For example, the slot width may be slightly smaller for accommodating a filtering chamber using sand or other relatively fine particulates, while the slot widths may be somewhat greater when in contact with certain of the manufactured zeolites or ion-exchange resin materials. In any event, as best shown by FIG. 5 of the drawing, each of the slots 15 and 15' through the wall of the ball-form member will have a wedge-shape increasing in cross-sectional area from the outside of the member toward the inside thereof. This construction, as hereinbefore noted, is of particular advantage in providing a self-cleaning or non-clogging type of opening when being utilized in a liquid system having subdivided particles that might well clog typical screens or strainer members which do not have the openings with the enlarging cross-sectional area aspect.

The present ball-type strainer members may be made of any metal suitable to withstand the erosion or corrosion aspects of the particular treating service as long as they have suitable wall thicknesses capable of withstanding the crushing pressures that may occur from hydraulic pressures in turn being exerted upon a superposed bed of contact material. On the other hand, the present form of ball- or spherical-form members may well be made of one of the various plastic or polymeric materials that can be readily molded and formed into the desired configuration with the wedge-form vertical slot means. Typically, each complete unit or member will be cast in two parts as heretofore described for FIG. 4. Thus, the engaging flange portions 16 and 17 for the respective hemispherical portions of each member will require a suitable cement or other bonding agent capable of sealing and holding the particular plastic or polymeric material. Such bonding agent will, of course, be at the zone 18 between the respective flange portions 16 and 17 of the two half portions of the member.

In the operation of the unit as a strainer or intake member, the water or other fluid will typically flow uniformly from the outside to the inside area 19 and thence through passageway 20 to the outlet end of extended portion 13. On the other hand, where the member is serving as a spaced outlet nozzle to distribute the backwash or regenerating stream into the lower end of the contact material surrounding the plurality of members, there will be an inward flow of liquid through passageway 20 into the interior portion 19 and thence outwardly through all of the plurality of slots 15 and 15'. In connection with this aspect of backwash flow, it may be noted that the lower slots 15' in lower hemispherical portion 12 will cause a downward and outward flow of the fluid by reason of the spherical configuration of the member and by reason of the flow being generally radially outwardly from the center of the spherical-form element. This downward and outward flow (indicated as $V_1$ in FIG. 4) is of particular advantage in providing a scrubbing action in the lower portion of the bed of contact material. As heretofore noted, in utilizing the common form of cylindrical strainer elements with horizontal slots, there is a radial outward flow of backwash fluid from the cylinder which tends to immediately flow upwardly and circumferentially from the element so as to leave "dead" or uncontacted areas of particulates in the lower portion of the bed of contact material surrounding the plurality of strainer elements.

It may be further noted in connection with the present form of strainer-nozzle member that with the utilization of an optimum diameter D for the non-perforate portion 14 at the top of the upper hemispherical portion 11 and with a conventional inlet velocity for the backwash stream through passageway 20 which tends to carry upwardly through the interior portion 19 and impinge on the inside surface of area 14, that there is typically a greater portion of fluid flow caused to emerge outwardly and downwardly through slots 15' than will emerge from slots 15. For example, with equivalent sizing and spacing for the slots 15 and 15', it appears that approximately 60% of the outlet fluid discharge will be caused to flow through slots 15' while approximately 40% will be through slots 15. This distribution, of course, will not occur if there is a large total open area being provided by slots 15 in the upper half of the member, with such area being considerably greater than the area of inlet 20 which accommodates the stream flow entering the member for backwash operations. It may be still further pointed out that the number and sizing of slots 15 can be correlated with the size D of blocked portion 14 as well as correlated with the number and sizing of slots 15' to accomplish the desired upward and downward flow distribution into the packed bed of contact material.

It should be noted, however, that the construction and arrangement illustrated in FIG. 4 is diagrammatic and is merely one embodiment of the strainer-nozzle member. Variations in construction for the overall configuration may well be made as long as the completed member is of a generally spherical form and will have vertical slotting uniformly provided over the surface of the element so as to result in the upward as well as in the downward and outward flow of fluid during backwash operations. In other words, there may be a different form of flange means at 16 and 17 or, in certain instances through the use of suitable bonding agents, there may be the elimination of such flanges to obtain a resulting spherical-form element. The number of slots utilized, the wall thickness, and the like, will, of course, vary in accordance with materials being utilized, the diameter of the spherical-form member, and the external pressures which may be exerted on the unit. Also, as heretofore noted, the present improved form of strainer-nozzle member is of particular utilization in permitting the construction of such member from a plastic or polymeric material. Still further, it is not intended to limit the material to any one type, inasmuch as polyvinyl chlorides, acrylonitrile-butadiene-styrene, delrin, teflon and the like, as well as polymeric materials that are reinforced with fiber materials, may well be utilized in molding or otherwise forming the one or more portions of the spherical-form members.

I claim as my invention:

1. In a pressure tight contacting chamber for accommodating the introduction and withdrawal of a liquid stream which effects contact with a bed of subdivided solid contact material retained therein and has a liquid distributing-withdrawal manifold section therein which can be subjected to crushing conditions from the superposed material and hydraulic pressure thereon, the improved design and arrangement, which comprises, in combination, a liquid manifold means traversing an interior lower end portion of said chamber, a fluid port means through said chamber communicating to the interior of said manifold means, and a plurality of hollow spherical-form strainer members spaced along and connective with said manifold means, with each spherical-form strainer member having a row of uniformly spaced vertically oriented slots in an upper hemispherical surface and a row of uniformly spaced vertically oriented slots in the lower hemispherical surface thereof, whereby there is an outward flow from the upper row of slots and an outward and downward flow of fluid from the lower row slots when such member is in operation as a nozzle, said vertically oriented slots in each spherical-form strainer member being of a wedge-form increasing in cross-sectional area from the exterior toward the interior thereof. each of said strainer members being spaced to have their discharge and withdrawal zones substantially traverse the cross-sectional area of said chamber and the superposed bed of particulates therein, each of said spherical-form strainer members having a non-perforated top portion opposing said fluid port means to the interior thereof, said spaced slot means in that portion of said spherical-form strainer members surrounding the non-perforated portion being of such dimension as to provide a total area less than the cross-sectional area of said port means to the interior of said strainer members, whereby in the operation of each of said members as a nozzle there is a resulting greater portion of fluid outlet flow from the slot portions thereof encompassing the inlet-outlet port means as compared to the slot portions thereof surrounding the non-perforated top portion thereof.

2. The chamber of claim 1 further characterized in that each spherical-form strainer member is formed of molded portions which have been bonded together to provide a complete member.

3. The chamber of claim 1 further characterized in that said manifold means comprises a piping system including spaced laterals adapted to accommodate the attachment of said plurality of spherical-form strainer members and have fluid pass therethrough.

4. The chamber of claim 1 further characterized in that said manifold means comprises a plate member adapted to accommodate said plurality of spaced spherical-form strainer members thereabove and have fluid pass therethrough.

* * * * *